US012332877B2

(12) United States Patent
Jiang et al.

(10) Patent No.: US 12,332,877 B2
(45) Date of Patent: Jun. 17, 2025

(54) METHOD FOR ACQUIRING STRUCTURED QUESTION-ANSWERING MODEL, QUESTION-ANSWERING METHOD AND CORRESPONDING APPARATUS

(71) Applicant: BEIJING BAIDU NETCOM SCIENCE TECHNOLOGY CO., LTD., Beijing (CN)

(72) Inventors: Wenbin Jiang, Beijing (CN); Yajuan Lyu, Beijing (CN); Yong Zhu, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 295 days.

(21) Appl. No.: 17/862,519

(22) Filed: Jul. 12, 2022

(65) Prior Publication Data

US 2023/0018489 A1 Jan. 19, 2023

(30) Foreign Application Priority Data

Jul. 19, 2021 (CN) .......................... 202110814649.7

(51) Int. Cl.
*G06F 16/24* (2019.01)
*G06F 16/21* (2019.01)
(Continued)

(52) U.S. Cl.
CPC .......... *G06F 16/243* (2019.01); *G06F 16/212* (2019.01); *G06F 16/245* (2019.01); *G06N 5/02* (2013.01)

(58) Field of Classification Search
CPC .... G06F 16/243; G06F 16/245; G06F 16/212; G06N 5/02
See application file for complete search history.

(56) References Cited

U.S. PATENT DOCUMENTS 11,301,502 B1 * 4/2022 Dijamco ............... G06F 16/334
12,013,850 B2 * 6/2024 Rahmfeld ............. G06F 40/30
(Continued)

FOREIGN PATENT DOCUMENTS

CN 109522393 A 3/2019
CN 109684354 A 4/2019
(Continued)

OTHER PUBLICATIONS

Extended European Search Report of European patent application No. 22183722.2 issued Dec. 14, 2022, 8 pages.
(Continued)

*Primary Examiner* — Alicia M Willoughby
(74) *Attorney, Agent, or Firm* — Brooks Kushman P.C.

(57) ABSTRACT

The present disclosure discloses a method for acquiring a structured question-answering (QA) model, a QA method and corresponding apparatuses, and relates to knowledge graph and deep learning technologies in the field of artificial intelligence technologies. A specific implementation solution involves: acquiring training samples corresponding to N structured QA database types, the training samples including question samples, information of the structured QA database types and query instruction samples used by the question samples to query structured QA databases of the types, N being an integer greater than 1; and training a text generation model by using the training samples to obtain the structured QA model, wherein the question samples and the information of the structured QA database types are taken as input to the text generation model, and the query instruction samples are taken as target output of the text generation model.

9 Claims, 7 Drawing Sheets

(51) Int. Cl.
*G06F 16/242* (2019.01)
*G06F 16/245* (2019.01)
*G06N 5/02* (2023.01)

(56) References Cited

U.S. PATENT DOCUMENTS

| | | |
|---|---|---|
| 2013/0226846 A1 | 8/2013 | Ming et al. |
| 2018/0336198 A1* | 11/2018 | Zhong ................... G06N 3/08 |
| 2021/0049158 A1* | 2/2021 | Jiao ..................... G06F 16/243 |
| 2021/0201174 A1 | 7/2021 | Huang et al. |
| 2021/0248455 A1* | 8/2021 | Reddy .................. G06N 3/045 |
| 2021/0374133 A1* | 12/2021 | Lin ................. G06F 16/24522 |
| 2022/0067281 A1* | 3/2022 | Hu .......................... G06F 40/30 |
| 2022/0129450 A1* | 4/2022 | Cao .................... G06F 16/2433 |
| 2022/0374420 A1* | 11/2022 | Relan .............. G06F 16/24522 |
| 2024/0061833 A1* | 2/2024 | Tangari ................ G06F 16/243 |
| 2024/0061835 A1* | 2/2024 | Subramanian ........ G06F 16/252 |
| 2024/0184829 A1* | 6/2024 | Roy ................. G06F 16/90332 |

FOREIGN PATENT DOCUMENTS

| | | |
|---|---|---|
| CN | 109766417 A | 5/2019 |
| CN | 111046154 A | 4/2020 |
| CN | 111339246 A | 6/2020 |
| CN | 111767381 A | 10/2020 |
| CN | 112507098 A | 3/2021 |
| CN | 112966089 A | 6/2021 |
| CN | 113010693 A | 6/2021 |
| KR | 20210038449 A | 4/2021 |

OTHER PUBLICATIONS

Notice of Grant of Invention Patent Right of Chinese application No. 202110814649.7 dated Apr. 19, 2024, 8 pages.

* cited by examiner

FIG.1

| Brand | Model | Type | Price | Brand location | Driving form |
|---|---|---|---|---|---|
|  |  |  |  |  |  |
|  |  |  |  |  |  |

METHOD FOR ACQUIRING STRUCTURED QUESTION-ANSWERING MODEL, QUESTION-ANSWERING METHOD AND CORRESPONDING APPARATUS

CROSS-REFERENCE TO RELATED APPLICATIONS

The present application claims the priority of Chinese Patent Application No. 202110814649.7, filed on Jul. 19, 2021, with the title of "METHOD FOR ACQUIRING STRUCTURED QUESTION-ANSWERING MODEL, QUESTION-ANSWERING METHOD AND CORRESPONDING APPARATUS." The disclosure of the above application is incorporated herein by reference in its entirety.

FIELD OF THE DISCLOSURE

The present disclosure relates to the field of computer application technologies, and in particular, to knowledge graph and deep learning technologies in the field of artificial intelligence technologies.

BACKGROUND OF THE DISCLOSURE

A structured database has a regular data schema, which facilitates complex reasoning calculation operation, and thus can support answers to complex questions. Structured database-based question-answering (QA) may be in a variety of forms, such as knowledge-based question-answering (KBQA) with a knowledge graph as a back-end database and a table question-answering (TableQA) with a table as a back-end database. These QA forms have a wide range of business application requirements. Data required by a user question may come from either a knowledge graph or a table. The current QA forms only take one of the KBQA and the TableQA into account. Therefore, a QA effect is required to be improved.

SUMMARY OF THE DISCLOSURE

In view of the above, the present disclosure provides a method for acquiring a structured QA model, a QA method and corresponding apparatuses, so as to improve a QA effect.

According to a first aspect of the present disclosure, a method for acquiring a structured QA model is provided, including acquiring training samples corresponding to N types of structured QA database, each training sample comprising a question sample, information of the type of a structured QA database and a query instruction sample used by the question sample to query the structured QA database of the type, N being an integer greater than 1; and training a text generation model by using the training samples to obtain the structured QA model, wherein the question samples and the information of the types of structured QA database are taken as input to the text generation model, and the query instruction samples are taken as target output of the text generation model.

According to a second aspect of the present disclosure, a QA method is provided, including acquiring questions and information of types of structured QA database; inputting the questions and the information of the types of structured QA database to a structured QA model, to obtain query instructions outputted by the structured QA model; and querying a structured QA database corresponding to the type by using the query instructions, to obtain answers corresponding to the questions; wherein the structured QA databases are pre-trained with the method as described above.

According to a third aspect of the present disclosure, an electronic device is provided, including at least one processor; and a memory communicatively connected with the at least one processor; wherein the memory stores instructions executable by the at least one processor, and the instructions are executed by the at least one processor to enable the at least one processor to perform a method for acquiring a structured question-answering (QA) model, wherein the method includes: acquiring training samples corresponding to N types of structured QA database, each training sample comprising a question sample, information of the type of a structured QA database and a query instruction sample used by the question sample to query the structured QA database of the type, N being an integer greater than 1; and training a text generation model by using the training samples to obtain the structured QA model, wherein the question samples and the information of the types of structured QA database are taken as input to the text generation model, and the query instruction samples are taken as target output of the text generation model.

According to a fourth aspect of the present disclosure, there is provided a non-transitory computer readable storage medium with computer instructions stored thereon, wherein the computer instructions are used for causing a method for acquiring a structured question-answering (QA) model, wherein the method includes: acquiring training samples corresponding to N types of structured QA database, each training sample comprising a question sample, information of the type of a structured QA database and a query instruction sample used by the question sample to query the structured QA database of the type, N being an integer greater than 1; and training a text generation model by using the training samples to obtain the structured QA model, wherein the question samples and the information of the types of structured QA database are taken as input to the text generation model, and the query instruction samples are taken as target output of the text generation model.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

QA forms of different structured QA databases such as KBQA and TableQA have independent technical routes and characteristics. KBQA generally applies to questions involving physical relationships, such as "Where is Character A's wife from". TableQA generally applies to questions involving algorithms such as Max, Min, Average, Enumerate and Comparison, such as "What are domestic SUVs from RMB 350,000 to RMB 500,000". However, in essence, different forms have inherent similarities and are based on the comprehensive understanding of questions and database schemas, and answers are obtained from retrieval of relevant content in the databases. Therefore, if questions can be analyzed and understood by using a general model, a better QA effect may be achieved.

At present, an existing general model is to find a solution uniformly in the form of TextQA for such as KBQA and TableQA as well as TextQA (text QA form). TextQA is an unstructured QA form, which gives a question and a text paragraph including an answer and then looks for the answer to the question from the text paragraph. TextQA can support a wider range of QA requirements, but in essence, it degenerates the structured QA forms such as KBQA and TableQA into unstructured QA forms to find a solution, which loses the advantages of the original structured QA forms. That is, complex operations cannot be supported, and the convenience of maintenance and expansion of structured QA databases is greatly reduced.

Figure 1:
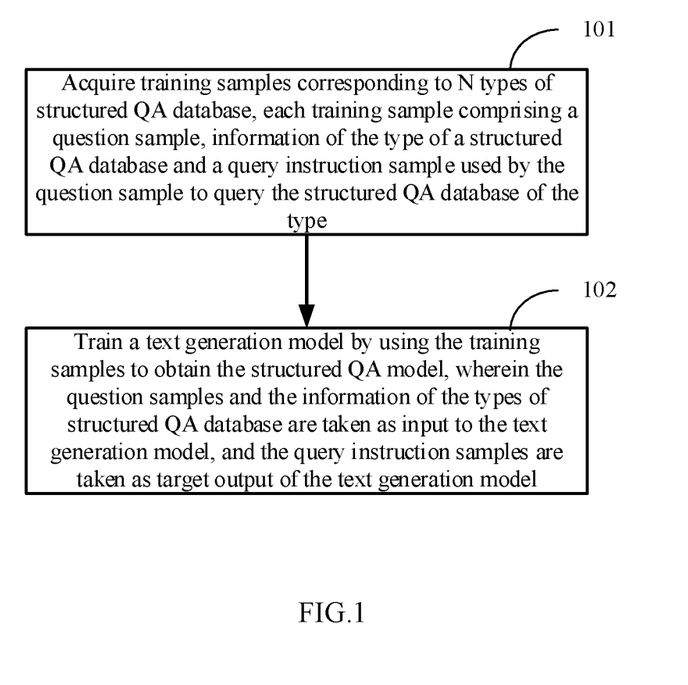
FIG. 1 is a flowchart of a method for acquiring a structured QA model according to an embodiment of the present disclosure.

In view of the above, the present disclosure provides a new model to realize unified understanding of various structured database QA forms. FIG. 1 is a flowchart of a method for acquiring a structured QA model according to an embodiment of the present disclosure. The method is performed by an apparatus for acquiring a structured QA model. The apparatus may be an application located on a server side or a functional unit in an application located on a server side such as a plug-in or a Software Development Kit (SDK), or located in a computer terminal with strong computing capability, which is not particularly limited herein in the embodiment of the present invention. As shown in FIG. 1, the method includes the following steps.

In 101, training samples corresponding to N types of structured QA database are acquired, the training samples including a question sample, information of the type of a structured QA database and a query instruction sample used by the question sample to query the structured QA database of the type, N being an integer greater than 1.

The structured QA database types may include such as table-based structured QA databases and knowledge-based structured QA databases. The two types may be described as examples in subsequent embodiments. However, in addition to the two types, other types of structured QA databases may also be used.

In 102, a text generation model is trained by using the training samples to obtain the structured QA model, wherein the question samples and the information of the types of structured QA database are taken as input to the text generation model, and the query instruction samples are taken as target output of the text generation model.

As can be seen, in the present disclosure, a general model is constructed based on different structured QA database types to analyze and understand questions, so as to obtain query instructions corresponding to the questions. The general model can fully understand different types of structured QA databases and annotated samples, so as to achieve a better QA effect.

The above steps are described in detail below with reference to embodiments. Firstly, step 101 "acquiring training samples corresponding to N types of structured QA database" is described in detail.

In the embodiment of the present disclosure, the information of the type of the structured QA database comprises: data schema information corresponding to the type of the structured QA database; or data schema information corresponding to the type of the structured QA database and task identifiers corresponding to the type of the structured QA database. That is, the training samples may be represented as a three-tuple <question, data schema, query instruction> or as a four-tuple <question, data schema, task identifier, query instruction>.

The task identifiers may be understood as identifiers indicating types of structured QA databases queried by the questions. For example, KBQA is identified by 0, and TableQA is identified by 1.

The data schemas may be understood as data schemas used by the structured QA databases. The data schemas may take the form of text sequences, charts, or other data structures, specifically depending on specific types of the structured QA databases. However, since questions, task identifiers and data schemas subsequently inputted during the training may be spliced in the form of sequences, various data schemas here may be expressed in a serialization manner.

The query instructions may be understood as query instructions used to query the structured QA databases for the questions, and answers corresponding to the questions can be obtained by querying the structured QA databases with the query instructions. Different structured question database types corresponding to different query instruction languages. For example, Graph traversal Language (Gremlin) instructions are used for KBQA and Structured Query Language (SQL) instructions are used for TableQA.

Generally, query instruction information corresponding to the questions is provided in the data set of each type of structured QA databases. In this case, the training samples are directly composed of questions provided by the structured QA databases, query instructions and type information of the structured QA databases.

Figure 2A:
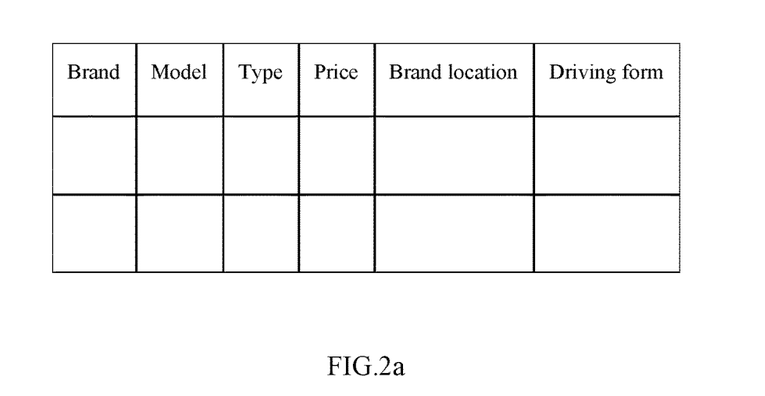
FIG. 2a and FIG. 2b are schematic diagrams of two data schemas according to an embodiment of the present disclosure.

For example, the questions provided in a TableQA data set include "What are domestic SUVs from RMB 350,000 to RMB 500,000", and the query instruction corresponding thereto is "select brand, model from T where price>=RMB 350,000 and price<=RMB 500,000 and type=SUV and brand location=China". "T" in the query instruction refers to a table name in the database. The task identifier of TableQA is 1, and the corresponding data schema is the table shown in FIG. 2a, which, after serialization, may be expressed as " . . . ‖‖type model price‖place of production . . . " Then, the four-tuple may form a piece of training data. Herein, it is to be noted that the table shown in FIG. 2a shows only partial fragments of the data schema, and a serialized representation shows only fragments.

Figure 2B:
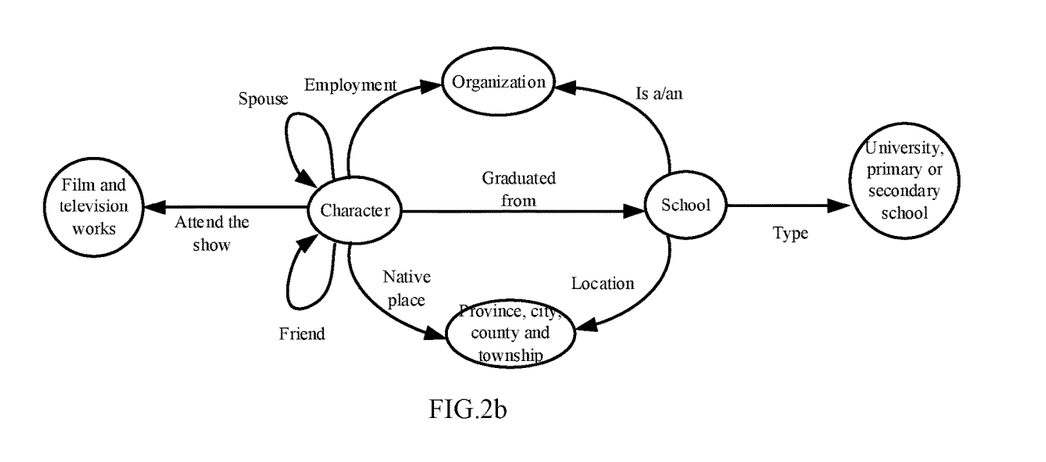

In another example, the questions provided in a KBQA data set include "Who is Character A's wife", and the query instruction corresponding thereto is "g.v ("A").outE ("spouse")". "g" in the query instruction refers to a name of the knowledge graph in the database. The task identifier of KBQA is 0, and the corresponding data schema is the knowledge graph shown in FIG. 2b, which, after serialization, may be expressed as " . . . (spouse, character),(employment, organization)) . . . " Then, the four-tuple may form a piece of training data. Herein, it is to be noted that the knowledge graph shown in FIG. 2b shows only partial fragments of the data schema, and a serialized representation shows only fragments.

There are also some structured QA databases that only provide answers to the questions, but do not provide query instruction information corresponding to the questions. In this case, path information from entities included in the questions to entities included in the answers may be acquired from the structured QA databases, and the query instructions corresponding to the questions may be generated by using the path information. Then, the questions, the query instructions and the information of the structured QA database types constitute training samples.

For example, the questions provided in the KBQA data set include "Where is B's wife's hometown" and the answer provided is "Sichuan." A knowledge graph database is queried for a path from a question entity to an answer entity: "B"–"wife"–"hometown"–"Sichuan", and according to the path, a query instruction "g.v("B").outE ("spouse").outE ("native place")" is automatically generated based on a preset rule.

Step 102 "training a text generation model by using the training samples to obtain the structured QA model" is described in detail below with reference to embodiments.

In this step, when the text generation model is trained by using the training samples, in each iteration, question samples of the training samples and the information of the structured question database type are inputted into the text generation model, and the text generation model predicts the query instructions. A training objective is to minimize differences between the query instructions obtained by the text generation model and the corresponding query instruction samples in the training samples.

In the embodiment of the present disclosure, the text generation model used may be an end-to-end model such as an Encoder-Decoder model or a Pointer-Generator Networks model. In the embodiment of the present disclosure, the Encoder-Decoder model is taken as an example for description.

Figure 3:
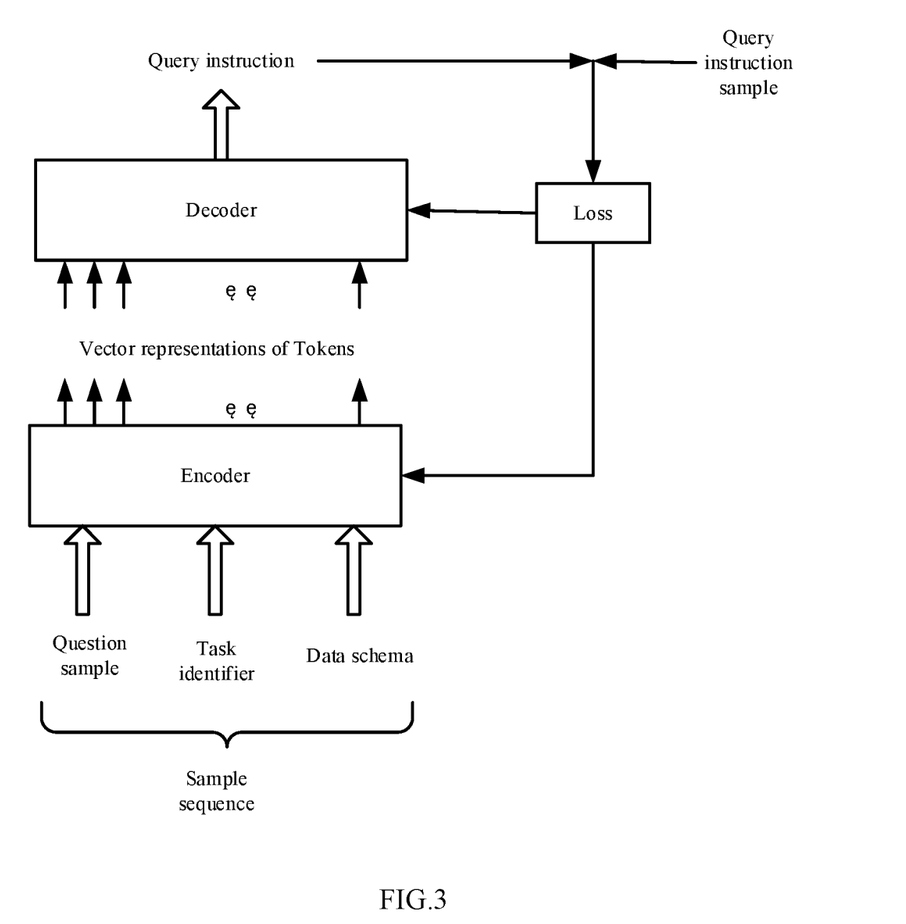
FIG. 3 is a schematic diagram of training of a structured QA model according to an embodiment of the present disclosure.

As shown in FIG. 3, the question samples, the task identifiers and the data schemas are spliced into a sample sequence. Delimiters (for example, insert "[sep]") may be inserted between the question samples, the task identifiers and the data schemas in the sample sequence. In this case, tokens in the sample sequence include characters and delimiters. The sample sequence serves as input to the encoder. The encoder encodes the sample sequence to obtain vector representations of the Tokens in the sample sequence.

The encoder may be implemented based on a network layer such as a Recurrent Neural Network (RNN) or a Transformer.

Taking the encoder based on a Transformer network layer as an example, embedding processing, including Word Embedding, Position Embedding and Segment Embedding, is first performed on the Tokens in the sample sequence. Word Embedding means performing word vector encoding on the Tokens to obtain word vector representations. Position Embedding means encoding positions of the Tokens in the sample sequence to obtain representations of the positions of the Tokens. Segment Embedding means encoding segments to which the Tokens belong to obtain representations of the segments. The Embedding may be performed by the encoder or a pre-trained model independent of the encoder.

After encoding by the encoder, vector representations of the Tokens may be obtained. The decoder performs mapping by using the vector representations of the Tokens to obtain query instructions. When performing mapping, the decoder may process an attention mechanism by using the vector representations of the Tokens. In addition, since the query instructions are predicted based on finite data sets, a copy mechanism may be added to the decoder, and restrictions on the query instructions may be added so that words outside a word list may not be predicted. The word list may be made up of words included in legitimate query instructions.

In each iteration, a Loss (loss function) is obtained by using differences between query instruction samples predicted by the encoder and the corresponding query instruction samples, and model parameters are updated by using the Loss until a preset iteration stop condition is met. The iteration stop condition may include: the Loss being less than or equal to a preset loss function threshold, a number of iterations reaching a preset number threshold, and so on.

The above training samples are training samples including more than one structured QA database types, such as training samples including KBQA and TableQA. In fact, KBQA and TableQA tasks share a same model, and a specific task identifier informs the model of a current QA task type to be solved.

The embodiment shown in FIG. 3 is described by taking four-tuple training samples as an example. If three-tuple training samples are used, the inputted sample sequence is formed by splicing the questions and the data schemas. The encoder and the decoder automatically learn used task type information during the training. In either manner, the trained structured QA models simultaneously use annotation data of a plurality of QA tasks to learn, and share information in the databases and the training samples during the training. Moreover, topology of structured QA databases for the plurality of QA tasks is preserved without any reduction in ease of maintenance and extension of the databases.

Figure 4:
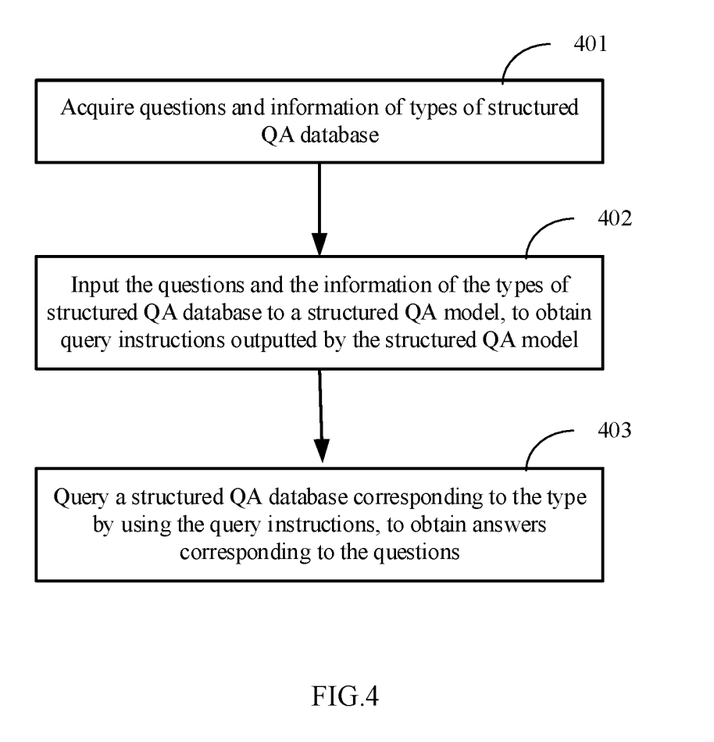
FIG. 4 is a flowchart of a QA method according to an embodiment of the present disclosure.

Automatic QA can be implemented based on the structured QA models trained in the above embodiment. FIG. 4 is a flowchart of a QA method according to an embodiment of the present disclosure. The method is performed by a QA apparatus. The apparatus may be an application located on a server side or a functional unit in an application located on a server side such as a plug-in or an SDK, or located in a computer terminal with strong computing capability, which is not particularly limited herein in the embodiment of the present invention. As shown in FIG. 4, the method may include the following steps.

In 401, questions and information of types of structured QA database are acquired.

In 402, the questions and the information of the types of structured QA database are inputted to a structured QA model, to obtain query instructions outputted by the structured QA model. The structured QA model is pre-established in the manner according to the embodiment in FIG. 1.

In 403, a structured QA database corresponding to the type is queried by using the query instructions, to obtain answers corresponding to the questions.

As can be seen, since the structured QA model shares question understanding and data schema understanding in a variety of structured QA database types, in actual QA applications, questions can be better understood by using the structured QA model to obtain corresponding query instructions, so as to obtain answers accurately by using the query instructions, improving a QA effect.

If four-tuples are used in the training of the structured QA model, that is, task identifiers and data schemas are used for information of the types of structured QA database, the information of the types of structured QA database acquired in step 401 is also the task identifiers and the data schemas. In the embodiment of the present disclosure, the types of structured QA database appropriately used for the questions, i.e. task identifiers, may be acquired by an additional pre-model or manually specified. The pre-module may be such as a task identification model. For example, question samples and task identifiers corresponding to the question samples are pre-collected, and a classification model is trained by taking the question samples as input and the task identifiers as target output, to obtain the task identification model.

In the embodiment of the present disclosure, after the task identifiers of the questions are determined, data schemas corresponding to the questions under the task identifiers may be obtained by using preset data schema information corresponding to the task identifiers. Once the task identifiers are determined, the type of structured QA database corresponding to the task is actually determinate, and the data schema information corresponding to the type, such as a text schema or a chart mode, is preset. According to the preset data schema information, the data schema corresponding to the question can be obtained.

In addition, once the task identifiers of the questions are determined, the structured QA database types corresponding to the task identifiers are determinate. In step 403, answers corresponding to the questions can be obtained by querying the structured QA databases by using the query instructions.

For example, assuming that, in a practical QA application, the question is "Which school is Character A's middle school", the pre-task identification model may obtain that the appropriate task identifier for the question is 0, namely KBQA. A data schema used by the question under the KBQA is acquired.

Then, an input sequence formed by the question, the task identifier and the data schema is inputted to the structured QA model, and the encoder in the structured QA model encodes Tokens in the input sequence, to obtain vector representations of the Tokens. The decoder in the structured QA model performs mapping by using the vector representations of the Tokens, to predict a query instruction, such as "g.v("A").outE ("graduated from").filter{it.Type=middle school}".

Then, a knowledge-based structured database corresponding to KBQA is queried by using the query instruction, to obtain an answer corresponding to the question, such as "middle school B".

If three-tuples are used in the training of the structured QA model, that is, data schemas are used for information of the structured QA database types, the information of the structured QA database types acquired in step 401 is also the data schemas. In the embodiment of the present disclosure, data schemas of the question under M structured QA database types may be determined respectively, M being a positive integer greater than 1. The M structured database types are selected from N structured database types in the embodiment shown in FIG. 1, i.e., M≤N. Then, in step 402, the questions and the data schemas under different structured database types are combined respectively to obtain M input sequences, which are respectively inputted to the structured QA model, to obtain query instructions under the M structured database types. Then, in step 403, the corresponding structured QA databases are queried respectively by using the obtained M query instructions, to obtain M answers. The answers obtained here may be the same or different. The obtained M answers may be returned to a user to allow the user for reference and selection. Alternatively, after the quality of the M answers is evaluated by other auxiliary means, one of them is selected and returned to the user. The other auxiliary means is not limited in the present disclosure.

For example, assuming that, in a practical QA application, the question is "Which school is Character A's middle school", a data schema corresponding to the question is represented as Data Schema 1 under KBQA and Data Schema 2 under TableQA. An input sequence formed by the question and Data Schema 1 is inputted to the structured QA model, and the structured QA model predicts a query instruction 1 corresponding to KBQA. An input sequence formed by the question and Data Schema 2 is inputted to the structured QA model, and the structured QA model predicts a query instruction 2 corresponding to TableQA.

A knowledge-based structured database corresponding to KBQA is queried by using the query instruction 1 to obtain Answer 1. A table-based structured database corresponding to TableQA is queried by using the query instruction 2 to obtain Answer 2. Answer 1 and Answer 2 may be returned to the user for reference, or after quality evaluation is performed on Answer 1 and Answer 2 by other auxiliary means, the answer with the high quality is returned to the user.

The above is a detailed description of the method according to the present disclosure, and the following is a detailed description of the apparatus according to the present disclosure.

Figure 5:
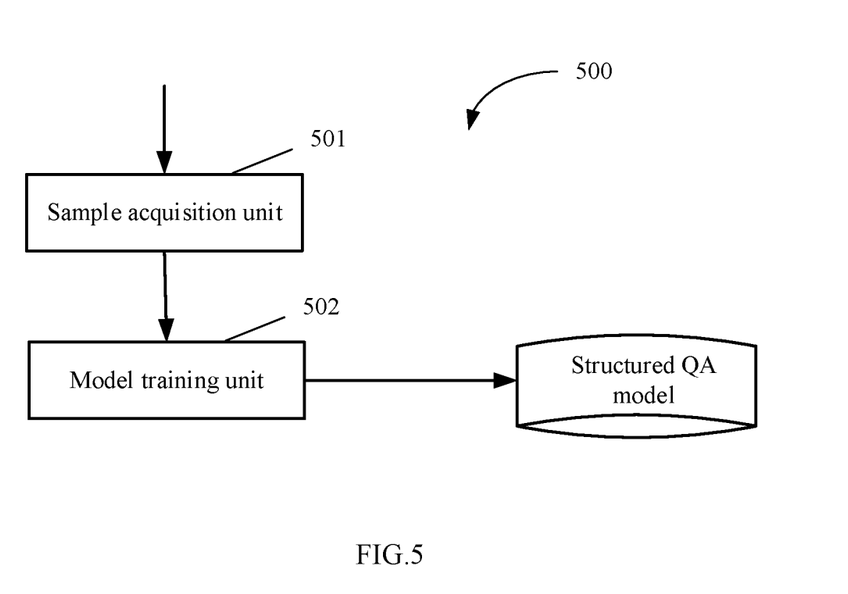
FIG. 5 is a structural diagram of an apparatus for acquiring a structured QA model according to an embodiment of the present disclosure.

FIG. 5 is a structural diagram of an apparatus for acquiring a structured QA model according to an embodiment of the present disclosure. As shown in FIG. 5, the apparatus 500 may include: a sample acquisition unit 501 and a model training unit 502. Main functions of the component units are as follows.

The sample acquisition unit 501 is configured to acquire training samples corresponding to N types of structured QA database, each training sample comprising a question sample, information of the type of a structured QA database and a query instruction sample used by the question sample to query the structured QA database of the type, N being an integer greater than 1.

The model training unit 502 is configured to train a text generation model by using the training samples to obtain the structured QA model, wherein the question samples and the information of the types of structured QA database are taken as input to the text generation model, and the query instruction samples are taken as target output of the text generation model.

As one implementation, the information of the type of the structured QA database may include data schema information corresponding to the type of the structured QA database.

As another implementation, the information of the type of the structured QA database may include data schema information corresponding to the type of the structured QA database and task identifiers corresponding to the type of the structured QA database.

As one implementation, the sample acquisition unit 501 may acquire, from a data set of the N structured QA database types, the question samples and the query instruction samples used by the question samples to query the corresponding structured QA databases.

As another implementation, the sample acquisition unit 501 may acquire, from a data set of the N types of structured QA database, the question samples and answers corresponding to the question samples, acquiring, from the corresponding structured QA databases, path information from entities comprised in the question samples to entities comprised in answer samples, and generate, by using the path information, the query instruction samples used by the question samples to query the corresponding structured QA databases.

As one implementation, the text generation model may include an encoder and a decoder.

The encoder is configured to encode a sample sequence obtained by splicing the question samples, the structured QA database type information and the query instruction samples in the training samples, to obtain vector representations of Tokens in the sample sequence.

The decoder is configured to perform mapping by using the vector representations of the Tokens in the sample sequence, to obtain query instructions.

A training objective used by the model training unit 502 is to minimize differences between the query instructions obtained by the decoder and the corresponding query instruction samples.

In addition to the encoder and decoder model, other end-to-end models such as a Pointer-Generator Networks model may also be used.

The N types of structured QA database may include, but are not limited to, table-based structured QA databases and knowledge-based structured QA databases.

Figure 6:
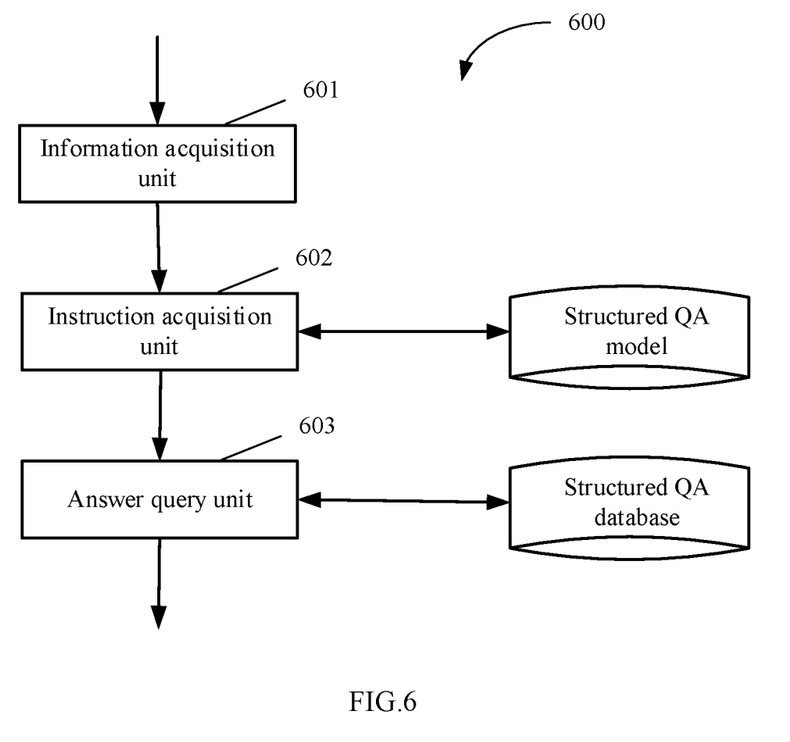
FIG. 6 is a structural diagram of a QA apparatus according to an embodiment of the present disclosure.

FIG. 6 is a structural diagram of a QA apparatus according to an embodiment of the present disclosure. As shown in FIG. 6, the apparatus 600 may include: an information acquisition unit 601, an instruction acquisition unit 602 and an answer query unit 603. Main functions of the component units are as follows.

The information acquisition unit 601 is configured to acquire questions and information of types of structured QA database.

The instruction acquisition unit 602 is configured to input the questions and the information of the types of structured QA database to a structured QA model, to obtain query instructions outputted by the structured QA model.

The answer query unit 603 is configured to query a structured QA database corresponding to the type by using the query instructions, to obtain answers corresponding to the questions.

The structured QA databases are pre-trained by the apparatus as shown in FIG. 5.

The information of the type of the structured QA database comprises: data schema information corresponding to the type of the structured QA database; or data schema information corresponding to the type of the structured QA database and task identifiers corresponding to the type of the structured QA database.

As one implementation, the information acquisition unit 601 may perform task identification on the questions by using a pre-task identification model, to obtain task identifiers to which the questions apply; and obtain, by using preset data schema information corresponding to the task identifiers, data schemas corresponding to the questions under the task identifiers to which the questions apply.

In the implementation, only one answer is obtained for one question, and the answer is returned to the user who asks the question.

As another implementation, the information acquisition unit 601 may acquire M data schemas of the questions under the types of structured QA database respectively, M being a positive integer greater than 1.

The instruction acquisition unit 602 combines the questions and the obtained M data schemas respectively to obtain M input sequences, and inputs the M input sequences to the structured QA model respectively, to obtain query instructions under The M structured database types.

Correspondingly, the answer query unit 603 queries the corresponding structured QA databases respectively by using the obtained M query instructions, to obtain M answers; and returns the M answers to a user, or returns the answer with the highest quality.

Various embodiments in the specification are described progressively. Same and similar parts among the embodiments may be referred to one another, and each embodiment focuses on differences from other embodiments. In particular, the apparatus embodiments are basically similar to the method embodiments, so the description thereof is relatively simple. Related parts may be obtained with reference to the corresponding description in the method embodiments.

Acquisition, storage and application of users' personal information involved in the technical solutions of the present disclosure comply with relevant laws and regulations, and do not violate public order and moral.

According to embodiments of the present disclosure, the present application further provides an electronic device, a readable storage medium and a computer program product.

Figure 7:
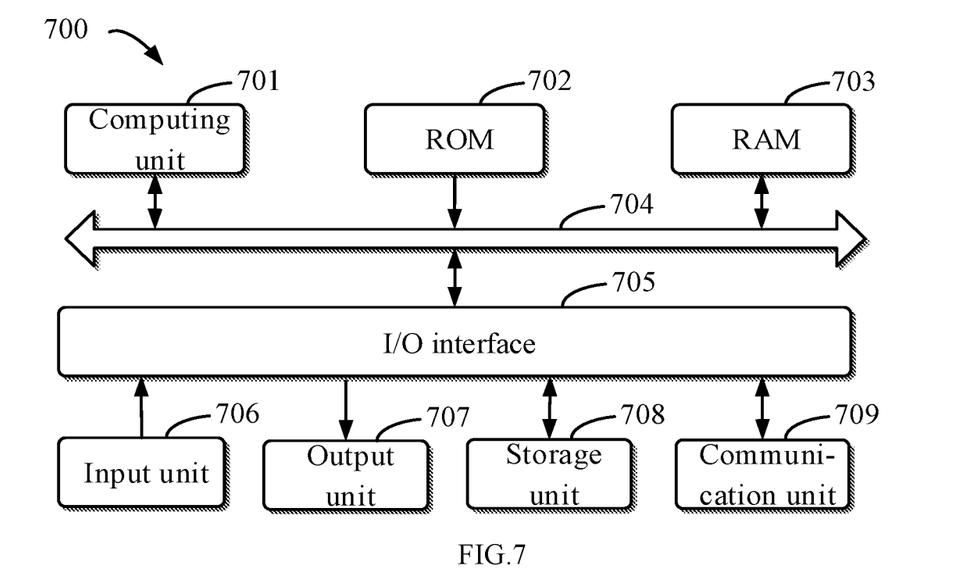
FIG. 7 is a block diagram of an electronic device according to an embodiment of the present disclosure.

FIG. 7 is a block diagram of an electronic device according to an embodiment of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 7, the device 700 includes a computing unit 701, which may perform various suitable actions and processing according to a computer program stored in a read-only memory (ROM) 702 or a computer program loaded from a storage unit 708 into a random access memory (RAM) 703. The RAM 703 may also store various programs and data required to operate the device 700. The computing unit 701, the ROM 702 and the RAM 703 are connected to one another by a bus 704. An input/output (I/O) interface 705 may also be connected to the bus 704.

A plurality of components in the device 700 are connected to the I/O interface 705, including an input unit 706, such as a keyboard and a mouse; an output unit 707, such as various displays and speakers; a storage unit 708, such as disks and discs; and a communication unit 709, such as a network card, a modem and a wireless communication transceiver. The communication unit 709 allows the device 700 to exchange information/data with other devices over computer networks such as the Internet and/or various telecommunications networks.

The computing unit 701 may be a variety of general-purpose and/or special-purpose processing components with processing and computing capabilities. Some examples of the computing unit 701 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 701 performs the methods and processing described above, such as the method for acquiring a structured QA model and the QA method. For example, in some embodiments, the method for acquiring a structured QA model and the QA method may be implemented as a computer software program that is tangibly embodied in a machine-readable medium, such as the storage unit 708.

In some embodiments, part or all of a computer program may be loaded and/or installed on the device 700 via the ROM 702 and/or the communication unit 709. One or more steps of the method for acquiring a structured QA model and the QA method may be performed when the computer program is loaded into the RAM 703 and executed by the computing unit 701. Alternatively, in other embodiments, the computing unit 701 may be configured to perform the method for acquiring a structured QA model and the QA method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present application may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A computer-implemented method for obtaining a structured question-answering (QA) model by training of text generation model, comprising:

acquiring training samples corresponding to N different types of structured QA database, each training sample comprising a question sample, information of the type of a structured QA database and a query instruction sample used by the question sample to query the structured QA database of the type, N being an integer greater than 1, wherein the N different types of structured QA database comprise: table-based structured QA databases and knowledge-based structured QA databases, and the information of the type of the structured QA database comprises: data schema information corresponding to the type of the structured QA database and a task identifier corresponding to the type of the structured QA database, the task identifier indicating the type of structured QA databases queried by the question sample; and training a text generation model by using the training samples corresponding to N different types of structured QA database to obtain a general structured QA model, wherein the structured QA model is configured to simultaneously use annotation data of a plurality of QA tasks to learn, and share information in the databases and the training samples during the training, and the question samples and the information of the types of structured QA database are taken as input to the text generation model, and the query instruction samples are taken as target output of the text generation model, wherein the text generation model comprises an encoder and a decoder;

the encoder is configured to encode a sample sequence obtained by splicing the question samples, the structured QA database type information and the query instruction samples in the training samples, to obtain vector representations of Tokens in the sample sequence, wherein the encoder is implemented based on a network layer which comprises a Recurrent Neural Network (RNN) or a Transformer;

the decoder is configured to perform mapping by using the vector representations of the Tokens in the sample sequence, to obtain query instructions which are used to query corresponding structured QA databases for the question sample; and a training objective of the text generation model is to minimize differences between the query instructions obtained by the decoder and the corresponding query instruction samples.

2. The method according to claim 1, wherein the step of acquiring training samples corresponding to N different types of structured QA database comprises:

acquiring, from a data set of the N structured QA database types, the question samples and the query instruction samples used by the question samples to query the corresponding structured QA databases; or acquiring, from a data set of the N different types of structured QA database, the question samples and answers corresponding to the question samples, acquiring, from the corresponding structured QA databases, path information from entities comprised in the question samples to entities comprised in answer samples, and generating, by using the path information, the query instruction samples used by the question samples to query the corresponding structured QA databases.

3. A question-answering (QA) method, comprising:

acquiring questions and information of types of structured QA database;

inputting the questions and the information of the types of structured QA database to a structured QA model, to obtain query instructions outputted by the structured QA model; and querying a structured QA database corresponding to the type by using the query instructions, to obtain answers corresponding to the questions;

wherein the structured QA database is pre-trained with the method according to claim 1.

4. The method according to claim 3, wherein the step of acquiring questions and information of types of structured QA database comprises:

performing task identification on the questions by using a pre-task identification model, to obtain task identifiers to which the questions apply; and obtaining, by using preset data schema information corresponding to the task identifiers, data schemas corresponding to the questions under the task identifiers to which the questions apply.

5. The method according to claim 3, wherein the step of acquiring questions and information of types of structured QA database comprises: acquiring M data schemas of the questions under the types of structured QA database respectively, M being a positive integer greater than 1;

the step of inputting the questions and the information of the structured QA database types to a structured QA model, to obtain query instructions outputted by the structured QA model comprises: combining the questions and the obtained M data schemas respectively to obtain M input sequences, and inputting the M input sequences to the structured QA model respectively, to obtain query instructions under the M structured QA database types; and the step of querying structured QA databases corresponding to the types by using the query instructions, to obtain answers corresponding to the questions comprises: querying the corresponding structured QA databases respectively by using the obtained M query instructions, to obtain M answers; and returning the M answers to a user, or returning the answer with the highest quality.

6. An electronic device, comprising:

at least one processor; and a memory communicatively connected with the at least one processor;

wherein the memory stores instructions executable by the at least one processor, and the instructions are executed by the at least one processor to enable the at least one processor to perform a method for obtaining a structured question-answering (QA) model by training of text generation model, wherein the method comprises:

acquiring training samples corresponding to N different types of structured QA database, each training sample comprising a question sample, information of the type of a structured QA database and a query instruction sample used by the question sample to query the structured QA database of the type, N being an integer greater than 1, wherein the N different types of structured QA database comprise: table-based structured QA databases and knowledge-based structured QA databases, and the information of the type of the structured QA database comprises: data schema information corresponding to the type of the structured QA database and a task identifier corresponding to the type of the structured QA database, the task identifier indicating the type of structured QA databases queried by the question sample; and training a text generation model by using the training samples corresponding to N different types of structured QA database to obtain a general structured QA model, wherein the structured QA model is configured to simultaneously use annotation data of a plurality of QA tasks to learn, and share information in the databases and the training samples during the training, and the question samples and the information of the types of structured QA database are taken as input to the text generation model, and the query instruction samples are taken as target output of the text generation model, wherein the text generation model comprises an encoder and a decoder;

the encoder is configured to encode a sample sequence obtained by splicing the question samples, the structured QA database type information and the query instruction samples in the training samples, to obtain vector representations of Tokens in the sample sequence, wherein the encoder is implemented based on a network layer which comprises a Recurrent Neural Network (RNN) or a Transformer;

the decoder is configured to perform mapping by using the vector representations of the Tokens in the sample sequence, to obtain query instructions which are used to query corresponding structured QA databases for the question sample; and a training objective of the text generation model is to minimize differences between the query instructions obtained by the decoder and the corresponding query instruction samples.

7. The electronic device according to claim 6, wherein the step of acquiring training samples corresponding to N different types of structured QA database comprises: acquiring, from a data set of the N structured QA database types, the question samples and the query instruction samples used by the question samples to query the corresponding structured QA databases; or acquiring, from a data set of the N different types of structured QA database, the question samples and answers corresponding to the question samples, acquiring, from the corresponding structured QA databases, path information from entities comprised in the question samples to entities comprised in answer samples, and generating, by using the path information, the query instruction samples used by the question samples to query the corresponding structured QA databases.

8. A non-transitory computer readable storage medium with computer instructions stored thereon, wherein the computer instructions are used for causing a method for obtaining a structured question-answering (QA) model by training of text generation model, wherein the method comprises:

acquiring training samples corresponding to N different types of structured QA database, each training sample comprising a question sample, information of the type of a structured QA database and a query instruction sample used by the question sample to query the structured QA database of the type, N being an integer greater than 1, wherein the N different types of structured QA database comprise: table-based structured QA databases and knowledge-based structured QA databases, and the information of the type of the structured QA database comprises: data schema information corresponding to the type of the structured QA database and a task identifier corresponding to the type of the structured QA database, the task identifier indicating the type of structured QA databases queried by the question sample; and training a text generation model by using the training samples corresponding to N different types of structured QA database to obtain a general structured QA model, wherein the structured QA model is configured to simultaneously use annotation data of a plurality of QA tasks to learn, and share information in the databases and the training samples during the training, and the question samples and the information of the types of structured QA database are taken as input to the text generation model, and the query instruction samples are taken as target output of the text generation model, wherein the text generation model comprises an encoder and a decoder;

the encoder is configured to encode a sample sequence obtained by splicing the question samples, the structured QA database type information and the query instruction samples in the training samples, to obtain vector representations of Tokens in the sample sequence, wherein the encoder is implemented based on a network layer which comprises a Recurrent Neural Network (RNN) or a Transformer;

the decoder is configured to perform mapping by using the vector representations of the Tokens in the sample sequence, to obtain query instructions which are used to query corresponding structured QA databases for the question sample; and a training objective of the text generation model is to minimize differences between the query instructions obtained by the decoder and the corresponding query instruction samples.

9. The non-transitory computer readable storage medium according to claim 8, wherein the step of acquiring training samples corresponding to N different types of structured QA database comprises:

acquiring, from a data set of the N structured QA database types, the question samples and the query instruction samples used by the question samples to query the corresponding structured QA databases; or acquiring, from a data set of the N different types of structured QA database, the question samples and answers corresponding to the question samples, acquiring, from the corresponding structured QA databases, path information from entities comprised in the question samples to entities comprised in answer samples, and generating, by using the path information, the query instruction samples used by the question samples to query the corresponding structured QA databases.

* * * * *